March 23, 1971  E. P. SCHOENTHALER  3,572,234
AIR SCREEN APPARATUS WITH FILTER REMOVAL MEANS
Filed April 24, 1969  2 Sheets-Sheet 1
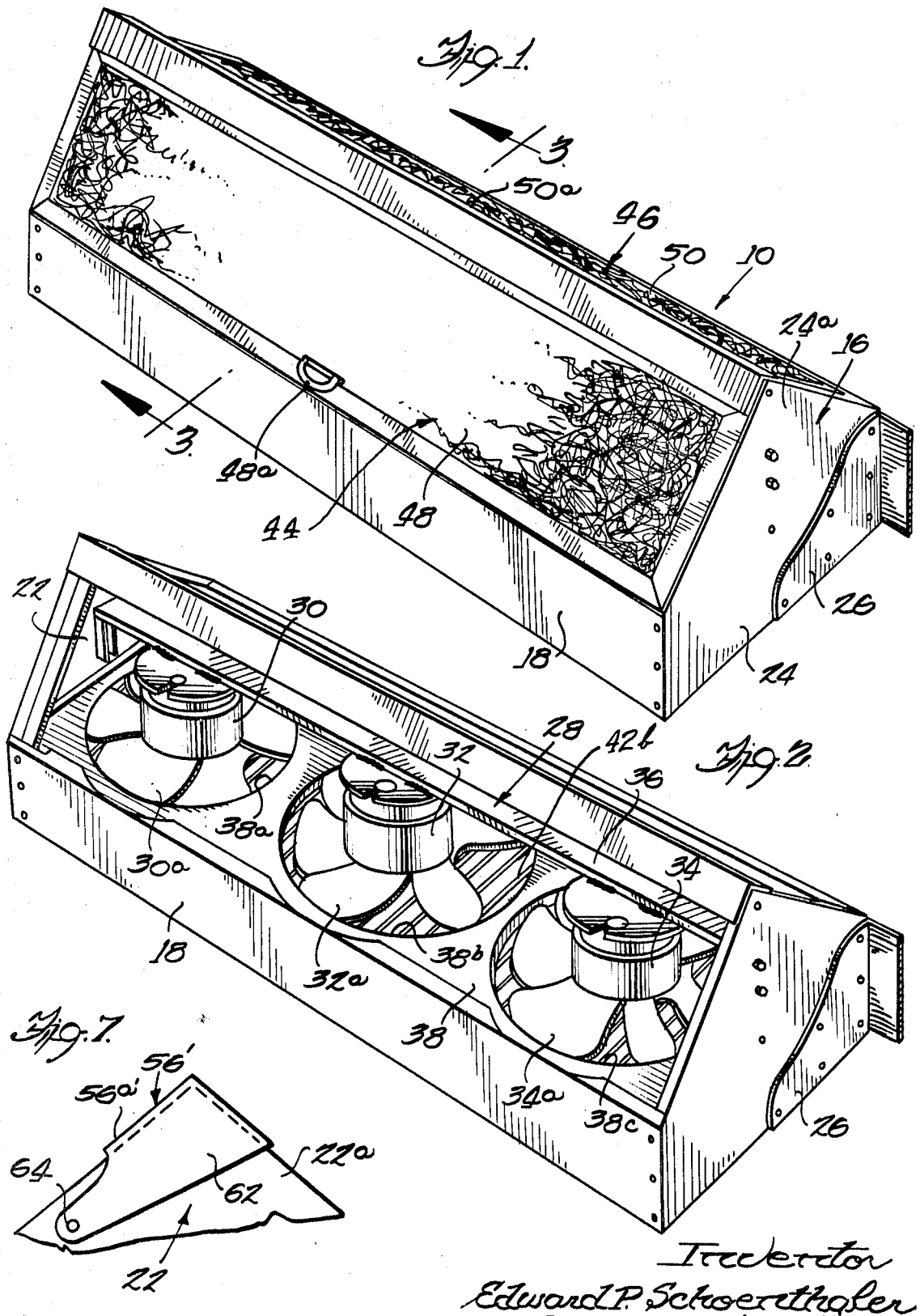
Inventor
Edward P. Schoenthaler
by Pendleton, Neuman, Seibold & Williams
Att'y's

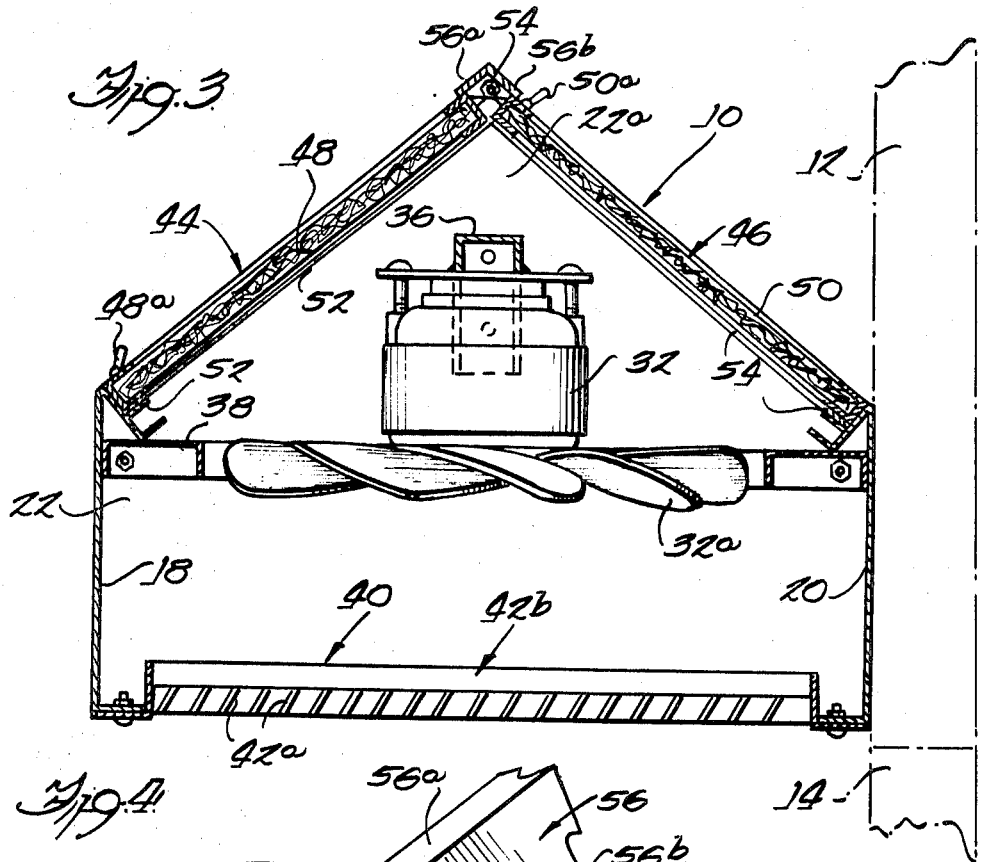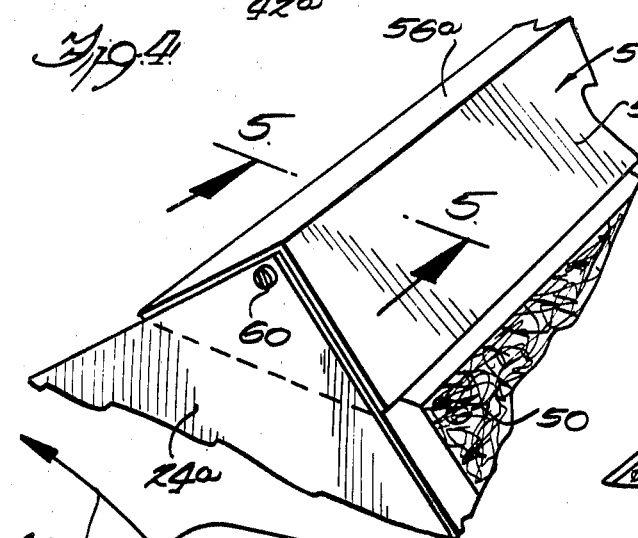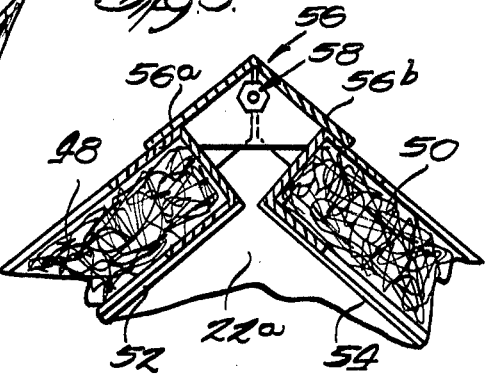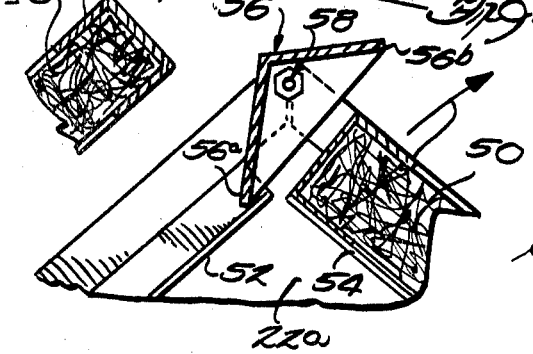

United States Patent Office 3,572,234
Patented Mar. 23, 1971

3,572,234
AIR SCREEN APPARATUS WITH FILTER REMOVAL MEANS
Edward P. Schoenthaler, Clarendon Hills, Ill.
(4225 Saratoga, Downers Grove, Ill. 60515)
Filed Apr. 24, 1969, Ser. No. 818,955
Int. Cl. F24f 9/00
U.S. Cl. 98—36    11 Claims

ABSTRACT OF THE DISCLOSURE

The air screen apparatus is mounted in juxtaposition with respect to a structure having an opening. Fans propel the air, louvers direct the air across the opening, and a pair of filter panels disposed upstream from the fans are angularly spaced with respect to each other and with respect to the air stream. A member disposed between the panels is movable between a first position wherein it covers the inner edges of the panels and permits withdrawal of the first panel and a second position wherein it permits withdrawal of said second panel.

BACKGROUND OF THE INVENTION

This invention relates to an improved air screen apparatus of the type which is adapted to direct a flow of air across an opening such as a door or window in order to prevent the passage therethrough of dust and insects, while at the same time leaving the opening free of obstructions. The apparatus is particularly adapted for use in connection with service windows of drive-in restaurants, for example, where it is highly desirable to prevent the ingress of dust or insects without interfering with the usual transaction of business through the window.

An apparatus of this type is generally placed above the door or window being screened, and the air is directed downwardly across the opening. It is highly desirable that such a device include a filter for filtering the air before it enters the unit so that any dust or the like which may be drawn into the unit will be filtered out rather than being recirculated by the unit. With a unit of this type the area of the filter should be as large as possible to provide a low resistance to the flow of air through the unit. At the same time the unit should be compact, and the filters must be designed so that they may be easily removed for cleaning. In fact, the entire unit must be designed for ease of cleaning and other maintenance.

The present invention features a novel filter arrangement providing a greater filter area and a more efficient filtering operation. The filter elements are mounted in such a manner as to permit them to be readily removed for cleaning and replacement.

SUMMARY OF THE INVENTION

The air screen apparatus constructed in accordance with this invention is adapted to be mounted on a structure such as a wall having an opening such as a door or a window. In accordance with one embodiment of the invention, the apparatus comprises a frame, one side of which is adapted to be mounted in juxtaposition with respect to the structure adjacent the opening therein. Mounted within the frame is an air-propelling means such as a fan or a plurality of fans. An air-directing means, such as, for example, a set of louvers is carried by the frame downstream from the air-propelling means and is adapted to direct the air from the air-propelling means across the opening in the structure. A pair of separate filter panels are carried by the frame, these being mounted in spaced relationship with respect to and upstream from the air-propelling means. The filter panels are angularly disposed with respect to one another, coming together to form the top ridge of the apparatus, and one of the panels has a bottom edge disposed along the side of the frame that is adjacent the wall on which the apparatus is mounted. Air is drawn by the air-propelling means through the pair of filter panels and then forced through the air-directing means across the opening of the structure.

In the preferred embodiment a member such as a flanged, angularly-shaped ridge cover is disposed intermediate the filter panels and is pivotally movable between a first position where it covers the inner edges of both panels at the extreme top of the apparatus and a second position wherein it permits withdrawal of the second of said panels. The first filter panel is preferably disposed in the path of movement of the ridge cover between its first and second positions so that the ridge cover is retained in its first position by the first panel and is movable to its second position only when the first panel has been withdrawn. The pivotal mounting of the ridge cover is a feature which keeps dust from accumulating between the filter panels and at the same time permits removal of the second or wall-adjacent panel for cleaning and servicing.

DESCRIPTION OF THE DRAWINGS

In the drawings:
FIG. 1 is a perspective view of an air-screen apparatus constructed in accordance with one embodiment of the invention;
FIG. 2 is a perspective view showing the apparatus of FIG. 1 with the filter panels removed;
FIG. 3 is an enlarged sectional elevational view of the apparatus taken substantially along line 3—3 of FIG. 1;
FIG. 4 is an enlarged perspective view of a portion of the apparatus of FIG. 1 showing the preferred mounting of the movable ridge cover;
FIG. 5 is a sectional elevational view of the portion of the apparatus taken substantially along line 5—5 of FIG. 4;
FIG. 6 is a sectional elevational view showing the portion of the unit illustrated in FIG. 5 after the first filter panel has been removed and the ridge cover has been tilted to permit removal of the second filter panel; and
FIG. 7 is an end elevational view of the apparatus showing a ridge cover of slightly modified construction and mounting.

DETAILED DESCRIPTION OF THE PREFERRED EMBODIMENTS

In the drawings there is illustrated an air screen apparatus 10 which is adapted to be mounted on a structure such as a building wall 12 above an opening such as a door or window 14. The apparatus may, for example, be mounted above the service window of a drive-in restaurant. The apparatus is adapted to blow a stream of air downwardly across the window opening, with the stream being directed in such a manner as to prevent the ingress of dust and flying insects through the otherwise open window. It will be appreciated, of course, that the apparatus has other applications, and it may be mounted at the side or even at the bottom of the window opening; however, it is usually mounted at the top of the opening since it is out of the way in this position.

The apparatus 10 includes a frame 16 which, as best illustrated in FIGS. 1 and 3, has a front wall 18, a rear wall 20, and a pair of end walls 22 and 24. The frame has a substantially rectangular cross section with the end walls 22 and 24 being gabled or provided with triangular top portions 22a and 24a respectively. The frame 16 of the apparatus 10 is adapted to be mounted with the rear wall 20 in juxtaposition with respect to the building wall 12 as shown in FIG. 3. If desired, mounting brackets 26 may be employed for this purpose, these brackets being mounted on the end walls 22 and 24 of the frame (only the bracket mounted on wall 24 being illustrated).

Disposed within the frame 16 is an air-propelling means 28. The air-propelling means 28 in this instance includes three electric fans 30, 32 and 34. These fans are mounted on and depend downwardly from a channel-support member 36 which extends between and is secured to the gabled portions of the end walls 22 and 24 of the frame. The fans 30, 32 and 34 have blades 30a, 32a and 34a, respectively, which are adapted to rotate within apertures 38a, 38b and 38c, respectively, of a diaphragm panel 38. The plane of rotation of blades of the fans preferably coincides with the diaphragm panel 38, and both are preferably oriented perpendicular to the walls of the frame 16 so that when the fans are operating, air will be directed downwardly through the apertures 38a, 38b and 38c of the diaphragm panel 38 and parallel to the walls of the frame. The diaphragm panel 38 is preferably located just below the gabled portions 22a and 24a of the end walls 22 and 24, as best illustrated in FIG. 3.

An air-directing means 40 is carried by the frame downstream, i.e., below, the diaphragm 38 and the fan blades 30a, 32a and 34a of the air-propelling means 28. The air-directing means 40 preferably comprises a plurality of longitudinal louvers 42a and transverse louvers 42b, both of which are preferably adjustably mounted with respect to the frame 16, so that the air stream from the air-propelling means 28 may be directed downwardly in the desired manner. Normally, the louvers 42a will be substantially vertically disposed to direct the air from the air-propelling means 28 downwardly across the opening 14 in the wall structure 12, and perhaps slightly forwardly away from the surface of the wall. It is often desirable to direct the portion of the air stream over each half of the window opening laterally at a very slight angle, and this can be accomplished by appropriate adjustment of louvers 42b.

The gabled or triangular top portions 22a and 24a of the end walls 22 and 24 of the frame extend above the level of the front and rear walls 18 and 20 to define the upper limits of the frame and the front and rear roof areas 44 and 46 of the frame. These roof areas are closed by means of filter panels 48 and 50 respectively. The filter panel 48 is supported on flange 52 recessed within the frame and extending along the sides and bottom of the roof area 44. In like manner, the filter panel 50 is supported on flange 54 recessed within the frame and extending along the sides and bottom of the roof area 46. Thus the filter panels 48 and 50 are supported on these flanges 52 and 54 respectively within the roof areas so that the outer surfaces of the panels coincide with or lie in the same plane with the angularly-disposed edges of the gabled portions 22a and 24a of the end walls.

The filter panels 48 and 50 extend substantially the length of the frame between the end walls 22 and 24 and extend upwardly from the upper extremity of the front and rear walls 18 and 20 of the frame to near the apex or top of the gabled portions 22a and 24a of the end walls. The illustrated filter panel 48 has a handle 48a for facilitating its removal from the recessed flange support 52, and the filter panel 50 has a simlar handle 50a for facilitating the removal of this panel from the recessed supporting flange 54.

In order to retain the filter panels and to prevent dust from catching between the angularly-disposed filter panels where they come together adjacent the top ridge of the frame 16, there is provided a flanged member or ridge cover 56. This ridge cover 56 is an elongated member which is substantially L-shaped in cross section and consists of a first flange portion 56a and a second flange portion 56b. The ridge cover 56 extends between and is pivotally connected to the gabled portions 22a and 24a of the end walls by suitable means such as coaxially aligned fasteners 58 and 60, respectively. The ridge cover 56 is mounted for pivotal movement about the axis of the fasteners 58 and 60 between a normal covering position illustrated in FIG. 5 wherein it covers the top edges of the panels 48 and 50, and a tilted position illustrated in FIG. 6 wherein it permits removal of the rear panel 50.

The provision of this tiltable ridge cover 56 is one of the features of this invention, and it permits the removal of the rear filter panel 50 even though the bottom edge of that filter panel is in substantial juxtaposition with respect to the structural wall 12 on which the apparatus 10 is mounted. As may be best seen in FIG. 3, the front panel 48 may be easily removed from its position by merely lifting up on the handle 48a to withdraw the bottom of the filter panel and then sliding the filter panel downwardly from under the flange 56a of the ridge cover 56. It is not possible, however, to remove the rear panel 50 in this same manner since the rear portion of the panel 50 is positioned too close to the wall structure 12 on which the unit is mounted. The bottom portion of the rear filter panel 50 cannot be lifted up nor can the panel be slid downwardly to withdraw it from under the flange 56b of the ridge cover.

By making the ridge cover 56 tiltable about a horizontal axis, the flange 56b may be swung out of its normal position so that the top of the filter panel 50 may be withdrawn first in the operation of removing this panel from the recessed supporting flange 54. Of course, before the ridge cover 56 may be tilted to the position illustrated in FIG. 6, it is first necessary that the front filter panel 48 be removed, otherwise the flange portion 56a of the ridge cover 56 will not be able to pivot downwardly as illustrated in FIG. 6. Once the front filter panel 48 has been removed in a manner previously described, i.e., by lifting upwardly on the bottom portion of the filter panel and sliding it downwardly from under the flange 56a, the flange 56a is free to move inwardly, and the ridge cover is free to pivot in the counterclockwise direction as viewed in FIGS. 5 and 6.

The feature of placing the front filter panel in the path of pivotal movement of the ridge cover 56 also insures that the ridge cover will be in place when the filter panels are in place, because the front filter panel can only be repositioned when the ridge cover is in place, and when repositioned this front filter panel locks the ridge cover in place.

It is preferred that the pivotal axis of the ridge cover 56, i.e., the axis of the pivotal fasteners 58 and 60, be located between the flanges 56a and 56b and intermediate the top and bottom extremities of the ridge cover when the latter is in its normal position as illustrated in FIG. 5. With this positioning of the axis the ridge cover 56 will be locked in its normal position as long as the front filter panel 48 remains in place to prevent the inward movement of the flange portion 56a. It is also preferred that the pivotal axis be a centric axis, i.e., located equidistant from the flanges 56a and 56b of the ridge cover.

An alternate structure is shown in FIG. 7 wherein the pivotal axis of the ridge cover 56′ is below the lowermost extremity of the ridge cover. This is accomplished by means of pivot arms 62 (only one of which is shown in FIG. 7). The upper end of the arm 62 is connected to the flange 56a′ of the ridge cover 56, and the lower end extends downwardly and is pivotally connected to the corresponding end wall 22 or 24 as the case may be of the frame 16. This connection is by means of a fastener 64. With this type of arrangement, the pivotal movement of the ridge cover 56′ does not depend upon the presence or absence of the front filter panel 48, and if desired the rear filter panel 50 may be removed without first removing the front filter panel 48.

The preferred embodiments are exemplary of the invention, and from these it may be seen that an air screen apparatus 10 constructed in accordance with this invention will, by the angular disposition of the filter panels 48 and 50, provide a large filter area with more efficient filtering operation and permitting greater passage of air through the unit than would otherwise be possible if the filter screens were disposed horizontally. The ridge cover retains the upper edges of the filter panels and prevents the accumulation of dirt between the filter panels. The novel pivotal mounting of this ridge cover permits the rear panel 50 to be easily removed even though it may be in substantial abutment with the wall structure 12 on which the apparatus is mounted.

What is claimed is:

1. An air screen apparatus for a structure such as a wall having an opening therethrough, said apparatus comprising a frame, one side of which is adapted to be mounted in juxtaposition with respect to the structure adjacent the opening therein, air-propelling means mounted within said frame, air-directing means carried by said frame downstream from said air-propelling means and adapted to direct air from said air-propelling means, and first and second filter panels separately carried by said frame in spaced relationship with respect to and upstream from said air-propelling means, said panels being angularly disposed with respect to one another, whereby said air-propelling means may draw air through said first and second panels and force air through said air-directing means, said second panel having an edge disposed adjacent to said frame one side, a member disposed intermediate said panels, said member being movable between a first position wherein it covers the inner edges of said panels and a second position wherein it permits withdrawal of said second panel, said first panel being disposed in the path of movement of said member between said first and second positions, whereby said member is retained in said first position by said first panel and is movable to said second position only when said first panel has been withdrawn.

2. An air screen apparatus for a structure such as a wall having an opening therethrough, said apparatus comprising a frame, one side of which is adapted to be mounted in juxtaposition with respect to the structure adjacent the opening therein, air-propelling means mounted within said frame, air-directing means carried by said frame downstream from said air-propelling means and adapted to direct air from said air-propelling means, and first and second filter panels separately carried by said frame in spaced relationship with respect to and upstream from said air-propelling means, said panels being angularly disposed with respect to one another, whereby said air-propelling means may draw air through said first and second panels and force air through said air-directing means, said second panel having an edge disposed adjacent to said frame one side, a member disposed intermediate said panels, said member being pivotally movable about an axis between a first position wherein it covers the inner edges of said panels and a second position wherein it permits withdrawal of said second panel.

3. The structure of claim 2 wherein said member is pivotally movable about a horizontal axis between said first and second positions.

4. The structure of claim 2 wherein said member is elongated and comprises a pair of integral angularly-disposed flanges which in said first position of said member are adapted to cover the inner edges of said first and second panels respectively.

5. The structure of claim 4 wherein the pivotal axis of said member is parallel to the longitudinal axis of said member and is disposed intermediate the flange portions of said member.

6. The structure of claim 5 wherein said pivotal axis is disposed substantially equidistant from said flange portions.

7. The structure of claim 4 wherein said pivotal axis is disposed forwardly of and below said member.

8. An air screen apparatus for a structure such as a wall having an opening therethrough, said apparatus comprising a frame, one side of which is adapted to be mounted in juxtaposition with respect to the structure adjacent the opening therein, air-propelling means mounted within said frame, air-directing means carried by said frame downstream from said air-propelling means and adapted to direct air from said air-propelling means, and first and second filter panels separately carried by said frame in spaced relationship with respect to and upstream from said air-propelling means, said panels being angularly disposed with respect to one another, whereby said air-propelling means may draw air through said first and second panels and force air through said air-directing means, said second panel having an edge disposed adjacent to said frame one side, a member mounted for movement between a first position in which it covers the inner edges of said panels and prevents withdrawal of said second panel and a second position wherein it permits withdrawal of said second panel, and said frame including means whereby said first panel is removable laterally of said frame when said member is in said first position.

9. The structure of claim 8 wherein siad member has a first flange which in said first position is adapted to cover the inner edge of said first panel and a second flange integral with and angularly disposed with respect to said first flange and adapted to cover the inner edge of said second panel when said member is in said first position.

10. The structure as in claim 8 wherein the opposite edge of said second panel is disposed adjacent and parallel to one edge of said first panel, said parallel adjacent edges extending parallel to said frame one side.

11. The structure as in claim 10 wherein said parallel adjacent edges form a ridge remote from said air propelling means.

References Cited

UNITED STATES PATENTS

| | | | |
|---|---|---|---|
| 2,675,094 | 4/1954 | Young | 55—480 |
| 3,229,609 | 1/1966 | Larson et al. | 98—36 |

MARTIN P. SCHWADRON, Primary Examiner

P. D. FERGUSON, Assistant Examiner

U.S. Cl. X.R.

55—483, 484, 490